United States Patent [19]
Benton et al.

[11] 3,914,371
[45] Oct. 21, 1975

[54] METHOD FOR PREPARING BORON-CARBIDE ARTICLES

[75] Inventors: Samuel T. Benton; David R. Masters, both of Knoxville, Tenn.

[73] Assignee: The United States Energy Research & Development Administration, Washington, D.C.

[22] Filed: Dec. 27, 1973

[21] Appl. No.: 428,927

[52] U.S. Cl. .............. 264/332; 29/182.7; 29/182.8; 106/43; 423/291; 423/439
[51] Int. Cl.² ..................... F27B 9/04; C04B 35/52; C01B 31/36; C04B 35/60
[58] Field of Search .............. 423/291, 439; 106/43; 264/65, 332; 29/182.7, 182.8, 203, 204

[56] References Cited
UNITED STATES PATENTS

| | | | |
|---|---|---|---|
| 2,613,154 | 10/1952 | Montgomery | 106/43 |
| 2,814,566 | 11/1957 | Glaser | 106/43 |
| 3,137,584 | 6/1964 | Fetterley | 106/43 |

OTHER PUBLICATIONS

Gangler, J.; Physical Properties of . . . Refractory Oxides and Carbides, in Journ. Amer. Der. Soc., 33 (12), 1950, pp. 367–375.

Young, J.; Materials and Processes, N.Y., 1954, pp. 690–693.

*Primary Examiner*—Walter R. Satterfield
*Attorney, Agent, or Firm*—John A. Horan; David S. Zachry; Earl L. Larcher

[57] ABSTRACT

The present invention is directed to the preparation of boroncarbide articles of various configurations. A stoichiometric mixture of particulate boron and carbon is confined in a suitable mold, heated to a temperature in the range of about 1,250° to 1,500°C. for effecting a solid state diffusion reaction between the boron and carbon for forming the boron carbide ($B_4C$), and thereafter the resulting boron-carbide particles are hot-pressed at a temperature in the range of about 1,800° to 2,200°C. and a pressure in the range of about 1,000 to 4,000 psi for densifying and sintering the boron carbide into the desired article.

4 Claims, No Drawings

METHOD FOR PREPARING BORON-CARBIDE ARTICLES

This invention was made in the course of, or under, a contract with the United States Atomic Energy Commission.

The present invention relates generally to the preparation of boron-carbide articles and more particularly to the preparation of such articles of near theoretical density by hot-pressing a stoichiometric mixture of elemental boron and carbon.

Boron carbide has been found to be a useful material in the nuclear reactor field as a poison and as a construction material for reactor control rods. Several procedures have been previously employed for preparing boron carbide, such as forming compacts of boron carbide by heating stoichiometric prportions of boron and carbon powder. Boron carbide has also been prepared by heating a stoichiometric mixture of boron and carbon powder to a temperature sufficient to melt the boron. While this technique produces boron carbide it has been found that an impurity in the form of graphite flake is disposed in layers within the product. The boron carbide formed by these techniques is ground into a fine powder, densified and then sintered under pressure to form the desired article such as a nuclear reactor control rod. However, it was found that these articles usually contain contaminants which are picked up during the grinding operation, which significantly detracts from this technique of forming boron-carbide articles.

Still another technique for forming particulate boron carbide which may be subsequently densified and sintered into an article of a desired configuration is the solid state diffusion reaction between boron oxide ($B_2O_3$) and carbon. In this reaction the mixture is hot-pressed to cause the boron-carbide powder-producing reaction. This technique requires that following the reaction the boron-carbide powder must be separated with some difficulty from the oxides and other contaminants produced by the reaction before the boron carbide can be used to form a product of the desired configuration. In this instance, it is important to prevent the incorporation of oxide inclusions in the boron-carbide article since there could be an undesirable seizing problem with the die or mold during the hot-pressing operation.

Accordingly, it is the principal aim or primary objective of the present invention to overcome or substantially minimize the above and other problems or shortcomings found to be attendant with the preparation of boron-carbide articles. This goal is achieved by utilizing a method wherein the boron carbide is formed and sintered into the desired configuration during a single operation with the method being practiced by the steps of blending particulates of elemental boron and carbon in stoichiometric proportions, confining the blend in a die capable of providing the desired configuration with surface portions of the die in contact in the powder being coated by suitable mold release agent, heating the blend at a temperature adequate to effect solid state diffusion of the boron and carbide to form the boron-carbide material, and then hot-pressing the boron carbide for densifying and sintering the boron carbide into the desired article shape or configuration.

Other and further objects of the invention will be obvious upon an understanding of the illustrative method about to be described, or will be indicated in the appended claims, and various advantages not referred to herein will occur to one skilled in the art upon employment of the invention in practice.

The present invention is directed to the preparation of articles of boron carbide ($B_4C$, 78.28 weight per cent boron and 21.72 weight per cent carbon) with these articles being of near theoretical density (2.54 g/cc). The method of this invention is practiced by confining a stoichiometric mixture or blend of particulate elemental boron and carbon in a die lined with a mold release agent and then successively heating the blend to a temperature in the range of 1,250° to 1,500°C. and hot-pressing the mold contents at a pressure in the range of 1,000 to 4,000 psi and a temperature in the range of 1,800° to 2,200°C. for durations adequate to effect a solid state diffusion reaction between the pressed-together particulates of boron and carbon to form particles of boron carbide and effect the formation of the boron-carbide article by sintering together adjacently disposed particles of boron carbide. These articles may be produced in any form or configuration normally obtainable by hot-pressing powders as is well known in the metallurgical art. For example, articles in the form of solid and open cylinders, rings, and the like may be readily formed of the boron-carbide powder.

The temperatures required for forming the boron carbide and for hot-pressing the boron-carbide powder are preferably achieved by heating at a continuously increasing rate of about 100° to 200°C. per hour. After reaching the desired hot-pressing temperature the pressure and temperature are preferably maintained for a duration of about 3 to 4 hours for assuring the attainment of a sintered product of the desired density.

The boron employed in the present invention is preferably elemental boron of high purity, e.g., 99+ per cent pure, in an average particle size of about 0.6 micron. The carbon is also of a particulate form of an average particle size of about 1.0 micron. The boron and carbon particulates are blended together in stoichiometric proportions, i.e., about 78 weight per cent boron and about 22 weight per cent carbon.

The blended mixture of the boron and carbon is confined in a graphite die having movable plungers therein capable of forcing the powders into an article of a desired configuration. This die or mold is in turn confined in a suitable press heated in any suitable manner such as induction heating. The heating and pressing steps are accomplished in an inert atmosphere such as argon or helium. Prior to loading the die with the boron-carbon mixture the die is lined with a mold release agent to assure that the boron or carbon does not react with the die components, which are preferably formed of graphite, and to assure that the product is readily releasable from the die upon the completion of the hot-pressing operation. Suitable mold release agents include graphite foil in flake form, graphite foil, graphite flakes, and in some instances graphite powders. It has been found when working with boron that a layer of relatively loose graphite such as provided by the aforementioned materials between the die surfaces and the hot-pressed article will provide for the release of the article from the die.

When practicing the present invention for the preparation of boron-carbide articles having an internal cavity or passageway, e.g., a crucible or ring, it is necessary to release the pressure and remove the mandrel forming the cavity or passageway from the article prior to substantially dropping the temperature below the reaction temperature since an excessive drop in temperature will cause the contraction of the boron-carbide article within the die against the mandrel so as to introduce deleterious cracking in the article.

After loading the die with the boron-carbon mixture it is preferable to press the mixture at a pressure in the range of about 50 to 100 psi during the heat-up of the die to the reaction temperature described above. This pre-press is desirable for the purpose of removing air or gases from the boron-carbon mixture and maintaining the position of the mixture within the die during heat-up.

When employing the temperatures and pressures described above for effecting the desired solid state reaction between the boron and carbon and the sintering of the resulting boron-carbide particles into the article, this article will possess a density of greater than about 98 per cent theoretical density, e.g., a density of about 2.5 g/cc, which is essentially 98.4 per cent of theoretical density.

In order to provide a more facile understanding of the present invention a typical article-forming operation is set forth below. This example is directed to the preparation of a boron-carbide cylinder weighing 105 grams with a length of 2.69 centimeters and a diameter of 4.5 centimeters.

Eighty-two grams of elemental boron of an average particle size of about 0.6 micron was mixed with 23 grams of carbon powder of an average particle size of 1.0 micron in a stoichiometric proportion of about 78.28 grams of boron to 21.72 grams of carbon. After this mixture was thoroughly blended it was loaded into a graphite die lined with a layer of flaked graphite foil. The loaded die was then placed in an induction-heated hot press. A pressure of 100 psi was then applied to the mixture during heating of the die to a temperature of 1,800°C., at which point the pressure on the die and the temperature were increased to 4,000 psi and 2,200°C., respectively, and maintained for a duration of 3 hours. At the conclusion of this 3-hour period the pressure and temperature were returned to ambient conditions in an argon atmosphere and the article was removed from the press. The spectrographic analysis of this cylinder indicated the impurities of the boron and carbon powder were not increased over that present in the powder prior to the hot-pressing operation. The density measurements of the cylinder indicated a density of 2.5 g/cc which is 98.4 per cent of theoretical density. Hardness measurements indicated a value of 3,200 KHN for the cylinder as compared to 2,800 to 3,300 KHN reported in the literature for boron carbide. The chemical composition of the cylinder was obtained by chemical analysis which indicated a boron content of 78.2 weight per cent and a carbon content of 21.7 weight per cent. The material in the cylinder was identified as boron carbide by X-ray diffraction.

It will be seen that the present invention affords a simple and economical method for producing boron-carbide articles in the desired product configuration which substantially eliminates the problems associated with grinding and inclusions of oxides and graphite in the product.

What is claimed is:

1. A method for preparing a boron-carbide article of near theoretical density in a predetermined configuration, comprising the steps of blending particulate elemental boron of an average particle size of about 0.6 micron and particulate carbon of an average particle size of about 1.0 micron in stoichiometric proportions of about 78 weight percent boron and about 22 weight percent carbon, confining the resulting blend in a mold of said configuration with surface portions thereof in contact with said blend being separate from the latter by a mold release agent substantially non-reactive with the components of the blend, heating the blend at a temperature in the range of about 1,250° to 1,500°C. to effect solid state diffusion of the boron and carbide for forming boron-carbide particles consisting of about 78 weight percent boron and about 22 weight percent carbon, increasing the temperature to a higher temperature in the range of about 1,800° to 2,200°C while maintaining the boron-carbide particles within said mold for sintering together the boron-carbide particles and applying a pressure load in the range of about 1,000 to 4,000 psi on the boron-carbide particles while at said higher temperature for increasing the density of the article to greater than 98 percent of theoretical density and maintaining said higher temperature and said pressure loading for a duration in the range of about 3 to 4 hours to form said boron-carbide article.

2. The method claimed in claim 1, wherein the heating to the first mentioned temperature and said higher temperature is continuous at a rate in the range of about 100° to 200°C. per hour.

3. The method claimed in claim 1 including the additional step of pressing the blend at a pressure in the range of about 50 to 100 psi while heating the blend up to the first mentioned temperature.

4. The method claimed in claim 1, wherein said mold release agent is selected from the group consisting of flaked graphite foil, graphite foil, graphite flakes, and graphite powder.

* * * * *